Figure 12:
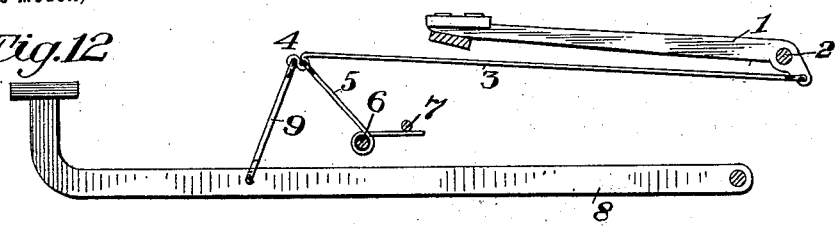

No. 694,015. Patented Feb. 25, 1902.
E. B. HESS.
WRITING MACHINE.
(Application filed Oct. 9, 1901.)
(No Model.) 3 Sheets—Sheet 1.
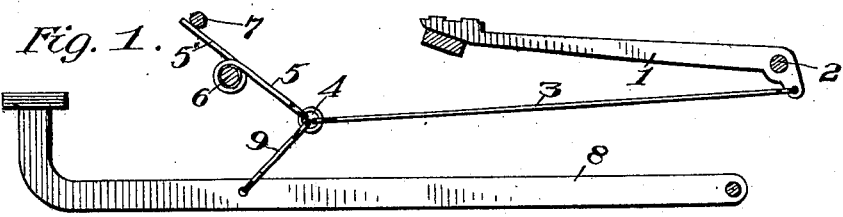
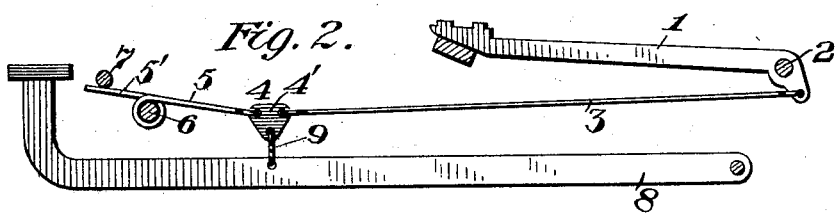
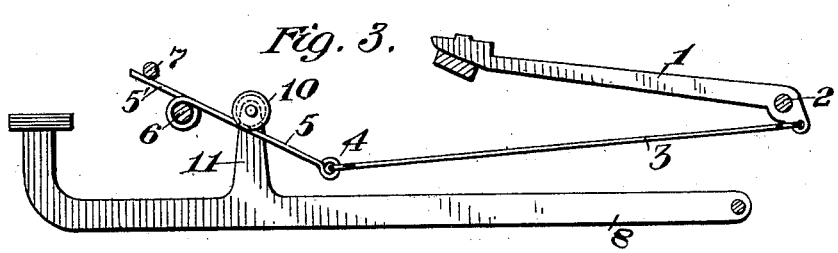
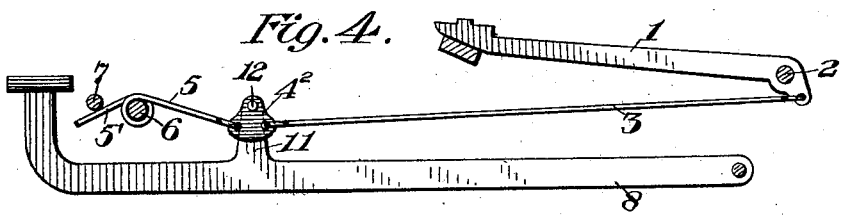
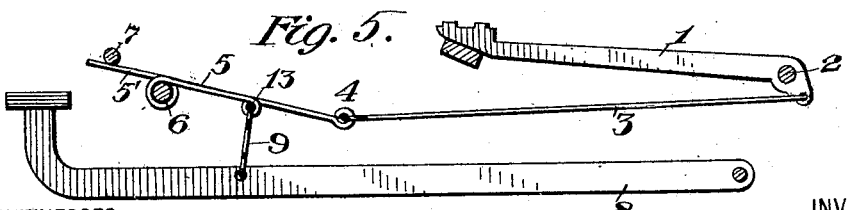
WITNESSES:
W. O. Stahlin
L. F. Browning
INVENTOR
Edward B. Hess
BY
Baldwin, Davidson & Wight
ATTORNEYS No. 694,015. Patented Feb. 25, 1902.
E. B. HESS.
WRITING MACHINE.
(Application filed Oct. 9, 1901.)
(No Model.) 3 Sheets—Sheet 2.
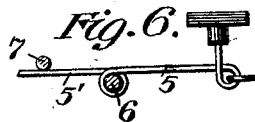
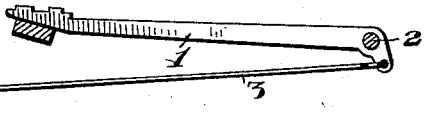
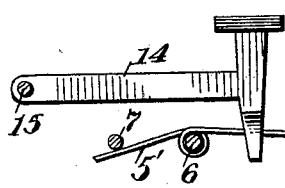
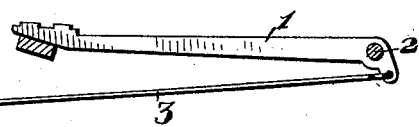
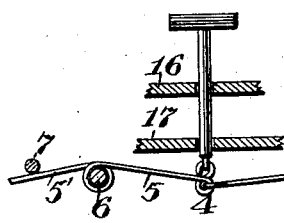
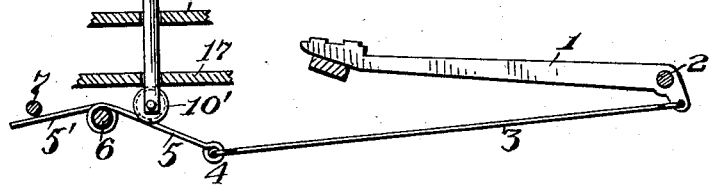
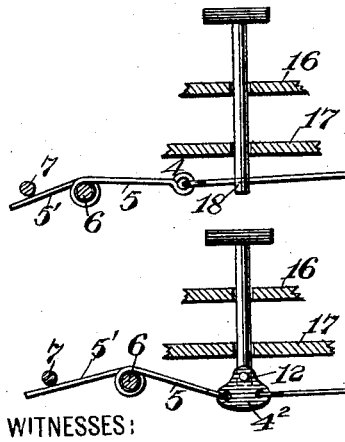
WITNESSES:
W. A. Stählin
L. F. Browning
INVENTOR
Edward B. Hess
BY
Baldwin, Davidson & Wight
ATTORNEYS.

No. 694,015. Patented Feb. 25, 1902.
E. B. HESS.
WRITING MACHINE.
(Application filed Oct. 9, 1901.)
(No Model.) 3 Sheets—Sheet 3.

Witnesses Edward B Hess Inventor

UNITED STATES PATENT OFFICE.

EDWARD B. HESS, OF BROOKLYN, NEW YORK, ASSIGNOR TO MECHANICAL IMPROVEMENTS COMPANY, OF NEW YORK, N. Y., A CORPORATION OF NEW YORK.

WRITING-MACHINE.

SPECIFICATION forming part of Letters Patent No. 694,015, dated February 25, 1902.

Application filed October 9, 1901. Serial No. 78,077. (No model.)

*To all whom it may concern:*

Be it known that I, EDWARD B. HESS, a citizen of the United States, residing in the borough of Brooklyn, city and State of New York, have invented certain new and useful Improvements in Writing-Machines, of which the following is a specification.

This invention relates to means for actuating the type-bars of a writing-machine on the depression of their finger-pieces; and its primary characteristic, which, so far as I know, is entirely new, is that one of the elements or members by which the type-bar is urged to the printing-point is a spring which is placed under tension by the depression of the finger-piece and which by its reaction tends to return the type-bar to and maintain it in its normal position. Of course this spring may be supplemented by one or more other springs applied in ways and locations well known and which ordinarily are the only springs which retain the type-bars and finger-pieces in their normal positions.

I am aware that in a style of type-bar movement quite different from that herein illustrated it has been proposed to interpose a coiled spring in the connection which actuates the type-bar and which is distended by a further downward movement of the finger-piece after the type-bar has impinged upon the platen, the intention being to cushion the finger-piece at or near the bottom of its stroke. Such an organization in no way resembles this invention, since the springs used therein do not by their reaction tend to return the type-bars and finger-pieces to and maintain them in their normal positions.

A further feature of this invention is that the spring which tends to return its type-bar and finger-piece to normal position and there retain them cushions or may be made to cushion the finger-piece at or near the bottom of its stroke.

The style of type-actuating mechanism to which I have shown this invention applied is one broadly claimed by me in a pending application, Serial No. 57,588, filed April 26, 1901, and illustrated in modified forms in Letters Patent of the United States Nos. 679,675 and 679,673, granted to me July 30, 1901, and No. 679,674, granted to myself and Joseph M. Stoughton jointly July 30, 1901. Such a style of type-bar movement comprises as an essential feature a flexing connection operatively connected at one end with its type-bar and at its other end with a fixed point and a means for operating thereupon intermediate its ends to produce a flexure thereof that throws the type-bar to the printing-point by a pull. In this kind of an organization the fixed point serves as an abutment or anchorage that supports the spring against compression, distortion, or flexing strain and holds it while reacting to normal position or condition, and which reaction tends to return the type-bar and finger-piece to normal position and so maintain them.

From the foregoing it will be apparent that this invention is radically distinguished from the universal custom of applying the reactionary spring to the type-bar, key-lever, finger-piece, or push-pin or other part of a mechanism by which power imparted to a finger-piece is transmitted to the type-bar to urge it against the platen.

Figure 13:
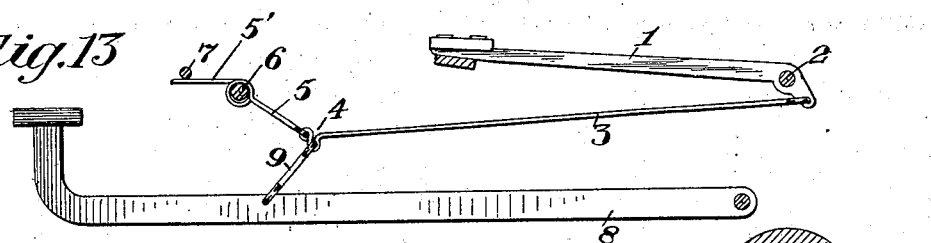
Figure 15:
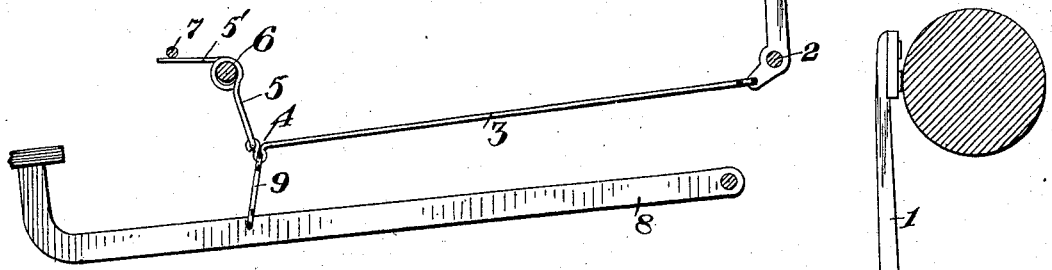
Figure 14:
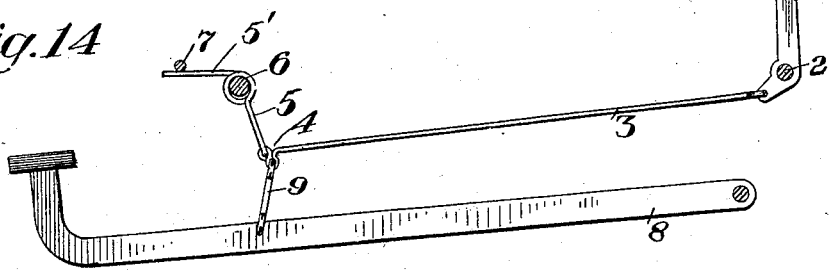

In the accompanying drawings, Figures 1 to 12, inclusive, show various ways in which the invention may be embodied in practical form; and Figs. 13, 14, and 15 show the same general arrangement with a slight modification in construction by which the spring is caused more efficiently to serve also as cushion to the finger-piece, Figs. 14 and 15 showing different positions of the parts illustrated in Fig. 13.

In the drawings some of the type-bars are shown with but a single character thereon. In such case there will be no change of relation between the type-bar support or segment and the platen. Others have two characters thereon, and it is therefore contemplated that there shall be a change of relation between the type-bar support and platen accomplished by shifting either of these members or both of them, all as is well understood in this art.

There is still another style of machine to which the invention is applicable—namely, that in which at will longitudinal motion is imparted to the respective type-bars, so as to print from either one of several characters arranged longitudinally thereon.

In the drawings it has not been deemed necessary to illustrate a complete keyboard, and the several figures therefore show but a single type-bar and its actuating devices. An invention such as that herein disclosed is, it is thought, illustrated fully in this way, and the addition of well-known parts of a writing-machine would be mere surplusage.

In Fig. 1 the type-bar 1 is pivoted at 2 in or upon a suitable support and has attached to it beyond its pivot a link 3, hinged at 4 to a link 5, rocking about a fixed point 6. The link 5 is a spring the coils of which embrace the part 6, the end 5' of the spring being held by a cross-bar, lug, or piece 7. The key-lever 8 is pivoted at its rear end and at the front equipped with an ordinary finger-piece, and between it and the hinge or point of flexure between 3 and 5 is interposed a link 9. Obviously when the key-lever is depressed the joint 4 is drawn down, and the link 3 moving endwise pulls the type-bar to the printing-point. During this lateral displacement, compression, or movement the coils of the spring 5 are contracted about the fixed point or bar 6. When the finger-piece is released, the reaction of the spring 5 tends to return all parts to normal position.

Fig. 2 shows a similar arrangement, except that the angular disposition of the links 3 5 is less acute (they practically might, of course, be parallel) and the hinge connection 4 is afforded by a plate 4', with which the adjacent ends of the links are connected, as is also the link extending to the key-lever 8. In this figure the link 9 stands vertical. It is apparent that the angular disposition of the links 3 5 9, Fig. 1, requires a less depth of depression of the key-lever or finger-piece than is required in Fig. 2 to bring the type-bar to the printing-point. In these and other figures the type-bars lie toward the front of the machine and are therefore adapted to strike against the front face of the platen, as is well understood.

In Fig. 3 substantially the same style of flexing connection 3 5 is shown; but in this case a grooved roller 10, running upon the upper side of the inclined spring-link 5, is mounted upon a projection 11, extending upwardly from the key-lever. The behavior of the spring in this case is the same as that already described.

In Fig. 4 the members 3 5 of the flexing connection are united at their adjacent ends by a plate $4^2$, and above the points of connection of the links 3 5 with this plate it is pivotally connected, as at 12, with a projection 11, extending up from the key-lever 8. The behavior of the spring-link 5 is the same as already described; but in this construction the plate $4^2$ maintains substantially its angular relation to the curve or arc described by the rear end of the link 5 as it descends, the operation being the same as that described in the Hess and Stoughton patent above mentioned.

In Fig. 5 the spring-link 5 is formed between the point 6 and the hinge 4 with an eye 13, which is engaged by the link 9, extending to the key-lever. This organization in respect to the mode of acting upon the flexing connection, or rather with respect to the point of application of power thereto, is similar to the construction shown in Fig. 3.

It may be said in a general way that where the front link 5 inclines downwardly, as in Figs. 1 and 3, the type-bar starts into motion with a greater velocity than where the arrangement is such as shown in Figs. 2 and 4 and that there is required, therefore, a correspondingly smaller depth of depression of the finger-piece. The depth of depression may also be determined by the distance between the point 6 and that at which power is applied to the flexing connection.

In Fig. 6 the rear end of the front link is bent to form an eye with which a link 3 engages and is then carried up vertically and equipped with a finger-piece.

Fig. 7 shows a flexing connection 3 4 5, similar to those already described. In this case, however, it is acted upon by a forked end of a lever 14, pivoted at 15 in front of the point 6 and equipped above its other end with a finger-piece.

In Fig. 8 the flexing connection 3 4 5 is actuated by a push-pin applied at the hinge 4, guided vertically in plates 16 17, and equipped at its upper end with a finger-piece. The arrangement is much the same in Fig. 9, except that there a stem carries at its lower end a grooved roller 10', that runs upon the inclined spring-link 5.

In Fig. 10 the stem has an aperture 18 in its lower end, through which the link 3 passes, the end of the stem being adjacent the hinge 4. When the finger-piece is depressed and the stem descends, the link 3 will slide in the aperture therein. The operation is in all respects the same as that already described.

Fig. 11 shows a flexing connection and coupling-plate $4^2$, substantially as in Fig. 4, except that instead of key-lever a stem finger-piece is shown, and at the point 12 the plate is pivoted to the end of the stem.

Fig. 12 shows a somewhat-different construction or arangement of links for actuating the type-bar. Here the link 3 and spring-link 5 are connected at their front ends by a hinge-joint and then extend rearwardly, one to the type-bar and the other to the fixed point or cross-bar 6. A link 9 extends from the parts 5 6 and preferably from the hinge-joint 4 to the key-lever, but is located in front of the point 6. Obviously on the depression of the finger-piece or key-lever the spring-link 5 moves downwardly and the link 3 is drawn to the front, thus actuating the type-bar. The reaction of the link 5 performs the function described. Of course a stem or finger-piece may be applied to the connections 3 4 5 of Fig. 12 in ways indicated in figures already described or in any suitable way.

If in such an organization as that shown in

Fig. 12 the finger-piece, whether it be applied to the connections 3 4 5 through the medium of a key-lever or otherwise, will be cushioned, if no limiting-stop be applied thereto at or near the bottom of its stroke by the spring 5 after the type-bar has struck the platen. The same is true to a certain extent of all the different styles that have been described, and particularly those shown in Figs. 3, 5, 7, 8, and 10. In order, however, to provide for more perfect cushioning of the finger-piece, I have adopted the arrangement shown in Fig. 13, the behavior of which is the same whether or not power imparted to the finger-piece is applied through the medium of a key-lever, as shown in said figure, or otherwise. The general arrangement of parts is substantially the same in all respects as in Fig. 1, except that the rearwardly-extending part of the spring-link 5 is not tangential to the upper part of its coils. It is shown as radial to the axis of the coil; but it need not necessarily occupy that particular relation thereto. The purpose of the arrangement is indicated in Figs. 14 and 15. The former shows the finger-piece depressed, flexing connection drawn down, and the type-bar at the printing-point. If now there be a further depression of the finger-piece, the coil of the spring 5 will yield and its rearwardly-extending part will move endwise, as shown in Fig. 15, thereby cushioning the finger-piece at the bottom of the stroke.

The specific construction shown in Fig. 12 is disclosed and specifically claimed in my application, Serial No. 73,570, filed August 28, 1901.

I claim as my invention—

1. In a writing-machine the combination of a pivoted type-bar, a finger-piece, a rigid but movably-mounted part to which the finger-piece is connected and devices interposed between said part and the type-bar by which power applied to the finger-piece is transmitted to the type-bar to actuate it, which interposed devices comprise a spring that is placed under tension as the finger-piece is depressed and the reaction of which tends to return the type-bar throughout its entire passage from the printing-point to its normal position of rest.

2. In a writing-machine, the combination of a pivoted type-bar, a finger-piece, a movably-mounted part to which the finger-piece is applied, a resilient member or spring, a connection between it and the type-bar and a connection between it and said movable part actuated by the finger-piece, whereby on the depression of the finger-piece the spring is placed under tension, the type-bar actuated and, on the release of the finger-piece, the reaction of the spring tends to return the type-bar throughout its entire passage from the printing-point to its normal position of rest.

3. In a writing-machine, the combination of a pivoted type-bar, a finger-piece, a spring mounted upon a fixed support and through which power applied to the finger-piece is transmitted to the type-bar, a connection between the spring and type-bar and between the spring and a part actuated by the finger-piece, the operation being substantially as described.

4. In a writing-machine, the combination of a pivoted type-bar, a finger-piece, a spring mounted upon a fixed support and through which power applied to the finger-piece is transmitted to the type-bar, a connection between the spring and type-bar and between the spring and the finger-piece, the operation being substantially as described.

5. In a writing-machine, the combination of a pivoted type-bar, two links flexibly connected, one operatively connected to the type-bar and the other a spring connected to a fixed point, a finger-piece, and a connection between it and the spring-link, whereby on the depression of the finger-piece the spring is placed under tension as its free end moves about the fixed point to throw the type-bar to the printing-point.

6. In a writing-machine, the combination of a pivoted type-bar, a finger-piece, and interposed devices, for transmitting power exerted on the finger-piece to the type-bar, comprising a spring placed under tension by lateral strain as the type-bar moves to the printing-point and capable of yielding resiliently endwise at or near the bottom of the stroke of the finger-piece, whereby the finger-piece is cushioned at the bottom of its stroke and the lateral reaction of the spring tends to return the type-bar to and maintain it in its normal position.

7. In a writing-machine, the combination of a pivoted type-bar, a finger-piece, a movably-mounted part actuated by the finger-piece and devices interposed between said part and type-bar through which power exerted on the finger-piece is transmitted to the type-bar, which interposed devices comprise a spring that cushions the finger-piece at the bottom of its stroke and by its reaction tends to return the type-bar throughout its entire passage from the printing-point to its normal position of rest.

8. In a writing-machine, the combination of a pivoted type-bar, a connection which extends forward from the type-bar to a fixed point, is capable of flexing intermediate its ends, and comprises a laterally-yielding spring whose free end is movable about said point as said connection is flexed, and means for flexing the connection to throw the type-bar to the printing-point and at the same time compress said spring.

9. In a writing-machine, the combination of a pivoted type-bar, a connection which extends forward from the type-bar to a fixed point, is capable of flexing intermediate its ends, and comprises a laterally-yielding spring capable also of yielding elastically endwise and whose free end is movable about said fixed point as said connection is flexed, and a finger-piece on the depression of which the spring is compressed by moving it about the fixed point, the type-bar thrown to the printing-point, and the finger-piece cushioned at the bottom of its stroke by the longitudinal yielding of the spring.

10. In a writing-machine, the combination of a pivoted type-bar, a connection which extends forward from the type-bar to a fixed point, is capable of flexing intermediate its ends, and comprises a laterally-yielding spring whose free end is movable about said point as said connection is flexed, and means for flexing the connection applied intermediate its ends to throw the type-bar to the printing-point and at the same time compress said spring.

11. In a writing-machine, the combination of a pivoted type-bar, a connection which extends forward from the type-bar to a fixed point, is capable of flexing intermediate its ends, and comprises a laterally-yielding spring capable also of yielding elastically endwise and whose free end is movable about said fixed point as said connection is flexed, and a finger-piece on the depression of which the flexing connection is operated upon intermediate its ends to compress the spring by moving it about the fixed point; the type-bar thrown to the printing-point; and the finger-piece cushioned at the bottom of its stroke by the endwise yielding of the spring.

12. In a writing-machine, the combination of a pivoted type-bar, a key-lever having a finger-piece applied thereto, and power-transmitting connections, between the key-lever and type-bar, comprising a spring that is placed under tension during the excursion of the type-bar to the printing-point and by its reaction tends to return the type-bar throughout its entire passage from the printing-point to its normal position of rest.

13. In a writing-machine, the combination of a pivoted type-bar, a key-lever, a spring attached to a fixed point or support and through which power applied to the key-lever is transmitted to the type-bar, a connection between the spring and type-bar and between the spring and key-lever, the organization being such that the spring is placed under tension as the type-bar moves to the printing-point and by its reaction tends to return the type-bar to and maintain it in its normal position.

14. In a writing-machine, the combination of a type-bar rocking about a fixed axis during any excursion of the bar from its normal position to the printing-point on the platen, a key-lever having a finger-piece applied thereto and power-transmitting connections, between the key-lever and the type-bar, comprising a spring placed under tension during the excursion of the type-bar to the printing-point and which by its reaction tends to return the type-bar to its normal position.

In testimony whereof I have hereunto subscribed my name.

EDWARD B. HESS.

Witnesses:
JOSEPH M. STOUGHTON,
LEWIS C. MYERS.